(12) United States Patent
Dare-Bryan

(10) Patent No.: US 6,808,033 B2
(45) Date of Patent: Oct. 26, 2004

(54) VEHICLE SUSPENSION SYSTEM

(75) Inventor: Val J Dare-Bryan, Burry St. Edmunds (GB)

(73) Assignee: Transportation Techniques, LLC, Denver, CO (US)

( * ) Notice: Subject to any disclaimer, the term of this patent is extended or adjusted under 35 U.S.C. 154(b) by 273 days.

(21) Appl. No.: 09/820,707

(22) Filed: Mar. 30, 2001

(65) Prior Publication Data

US 2001/0025737 A1 Oct. 4, 2001

(30) Foreign Application Priority Data

Mar. 31, 2000 (GB) .............................. 0007694

(51) Int. Cl.$^7$ .......................... B60K 1/00; B60K 17/00
(52) U.S. Cl. .................. 180/65.6; 180/363; 180/24.07
(58) Field of Search ................. 180/348, 383, 180/65.6, 65.7, 363, 24.07, 24.08

(56) References Cited

U.S. PATENT DOCUMENTS

| 1,481,405 A | * | 1/1924 | Anglada ..................... 180/65.6 |
| 2,176,170 A | * | 10/1939 | Flowers ........................ 180/23 |
| 2,317,623 A | * | 4/1943 | Lee ............................ 180/234 |
| 2,589,863 A | * | 3/1952 | Quartullo .................... 180/65.4 |
| 3,140,880 A | | 7/1964 | Masser |
| 4,065,153 A | | 12/1977 | Pringle |
| 4,130,172 A | * | 12/1978 | Moody ........................ 180/65.6 |
| 4,147,438 A | * | 4/1979 | Sandrone et al. ........ 400/144.2 |
| 4,166,640 A | | 9/1979 | Van Denberg |
| 4,171,830 A | | 10/1979 | Metz |
| 4,541,501 A | | 9/1985 | Kawasaki |
| 4,669,571 A | * | 6/1987 | Kurde ......................... 180/348 |
| 4,750,579 A | | 6/1988 | Jarl et al. |
| 4,805,710 A | | 2/1989 | Jarl et al. |
| 4,878,691 A | | 11/1989 | Cooper et al. |
| 4,974,697 A | * | 12/1990 | Krude ......................... 180/348 |
| 5,058,916 A | | 10/1991 | Hicks |
| 5,366,237 A | | 11/1994 | Dilling et al. |
| 5,512,022 A | | 4/1996 | Suzuki |
| 5,618,234 A | * | 4/1997 | Carden ........................ 464/109 |
| 5,649,719 A | | 7/1997 | Wallace et al. |
| 5,667,029 A | * | 9/1997 | Urban et al. ................ 180/65.2 |
| 5,680,908 A | * | 10/1997 | Reed ........................... 180/65.3 |
| 5,704,440 A | * | 1/1998 | Urban et al. ................ 180/65.2 |
| 5,878,830 A | * | 3/1999 | Ruppert et al. ............. 180/65.5 |
| 5,924,504 A | * | 7/1999 | Ruppert et al. .............. 180/61 |
| 6,276,474 B1 | * | 8/2001 | Ruppert et al. ............. 180/65.6 |
| 6,322,089 B1 | | 11/2001 | Dantele et al. |
| 6,508,482 B2 | | 1/2003 | Pierce et al. |

FOREIGN PATENT DOCUMENTS

| EP | 0 496 059 A1 | 7/1992 |
| EP | 0 705 724 A2 | 4/1996 |
| EP | 0 925 988 A2 | 6/1999 |
| FR | 2 530 212 | 3/1984 |
| GB | 1158761 | 4/1967 |
| WO | WO 99/06230 | 2/1999 |

* cited by examiner

Primary Examiner—Paul N. Dickson
Assistant Examiner—Joselynn Y Sliteris
(74) Attorney, Agent, or Firm—Oliff & Berridge, PLC

(57) ABSTRACT

A wheel suspension assembly for a vehicle having wheels and a chassis, the vehicle suspension system comprising a suspension unit for at least one wheel, the suspension unit including a first pivot arm of which a wheel is mounted and a second pivot arm mounted on the chassis, a drive unit mounted to the chassis, and a transmission unit between the drive unit and the wheel, the transmission unit arranged to accommodate pivoting of the second pivot arm relative to the chassis during operation of the vehicle.

18 Claims, 4 Drawing Sheets

VEHICLE SUSPENSION SYSTEM

BACKGROUND OF THE INVENTION

1. Field of Invention

The invention relates to vehicle suspension systems in which a suspension for a vehicle wheel is associated with a drive unit.

2. Description of Related Art

Vehicles usually have a prime mover or power unit which drives two or more wheels of a vehicle. However, individual drive units for hydraulically or electrically driving the individual wheels have been used.

SUMMARY OF THE INVENTION

The invention provides an improved vehicle suspension system incorporating a drive unit. According to the invention, the vehicle suspension system comprises a suspension unit for at least one wheel, a drive unit for the wheel and transmission means between the drive unit and the wheel. The suspension unit is pivotally attached to the chassis, and pivotally receives the wheel. The transmission means accommodates pivoting of the suspension unit relative to the chassis during operation of the vehicle.

In various exemplary embodiments, the drive unit is a motor arranged to drive the associated wheel and the transmission means includes a drive shaft, step down gearing, and a right angle gear box at the wheel.

In other exemplary embodiments, there is a drive unit for each of a pair of wheels of the vehicle, and control means for controlling the driven wheels to obtain the desired drive characteristics of the vehicle, whereby the driven wheels may be driven at the same or different speeds according to predetermined driving parameters of the vehicle, for example, travelling in a straight line or travelling around bends.

Other exemplary embodiments include two suspension units mounted on each end of a cross beam, which is mountable transversely on the vehicle chassis. In these embodiments, a drive motor for each drive wheel is mounted on the chassis in association with each suspension unit to drive the associated wheel. For a rear wheel drive vehicle, the cross beam may be mounted towards the rear of the vehicle and under the chassis.

In other exemplary embodiments, the drive motor or motors of the vehicle are electric motors and the step down gearing is mounted adjacent the associated driven wheel. The motors may be mounted above the cross beam and at or above the lower level of the chassis, whereby the transmission from the motor has a downwardly extending drive shaft. Constant velocity joints may be provided towards each end of the drive shaft to accommodate movements of the wheel.

BRIEF DESCRIPTION OF THE DRAWINGS

An exemplary embodiment of the invention is illustrated by the drawings, in which.

DETAILED DESCRIPTION OF PREFERRED EMBODIMENTS

Figure 1:
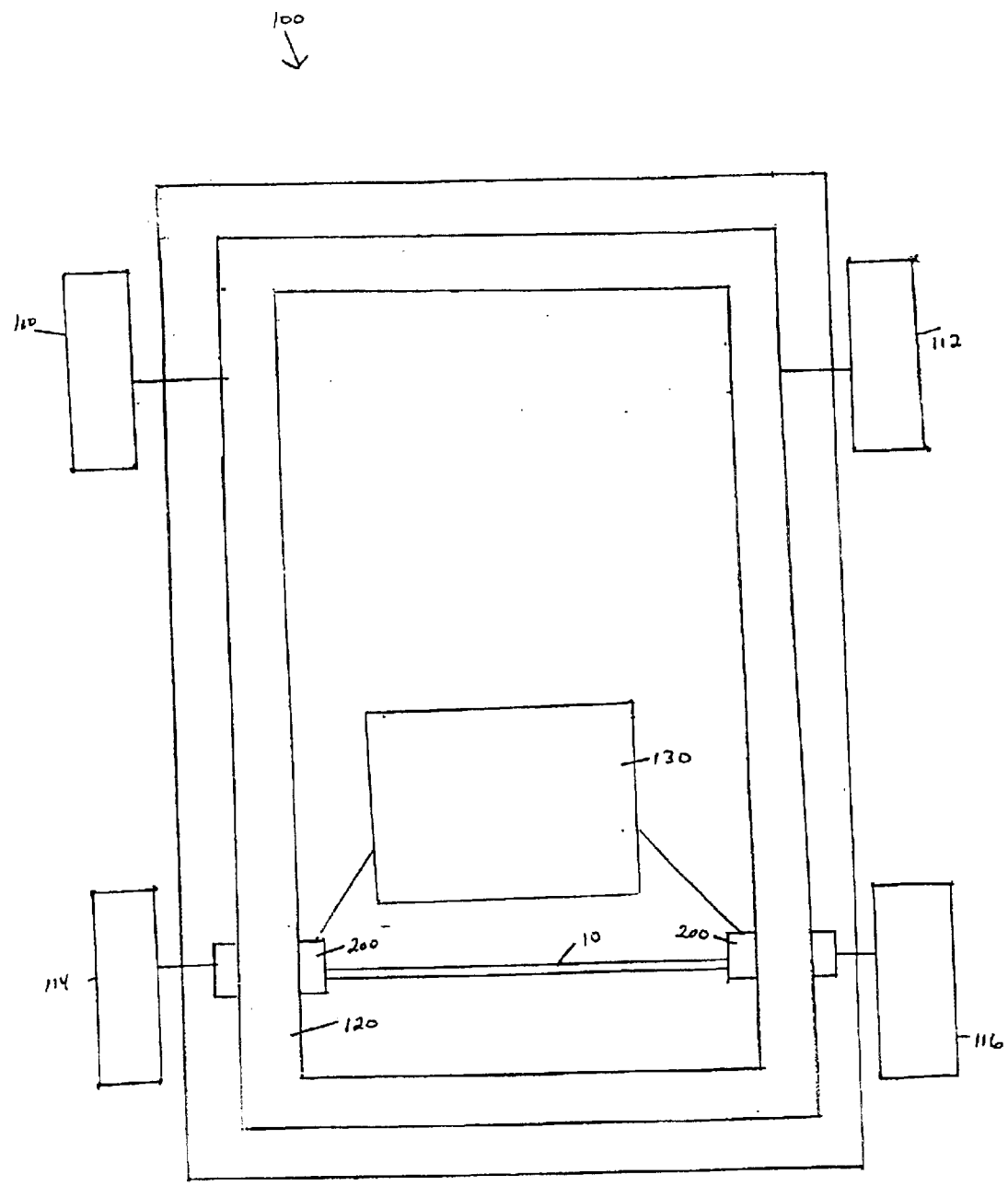
FIG. 1 is a schematic view of an exemplary embodiment of a series hybrid electric vehicle on which the invention can be utilized.
Figure 2:
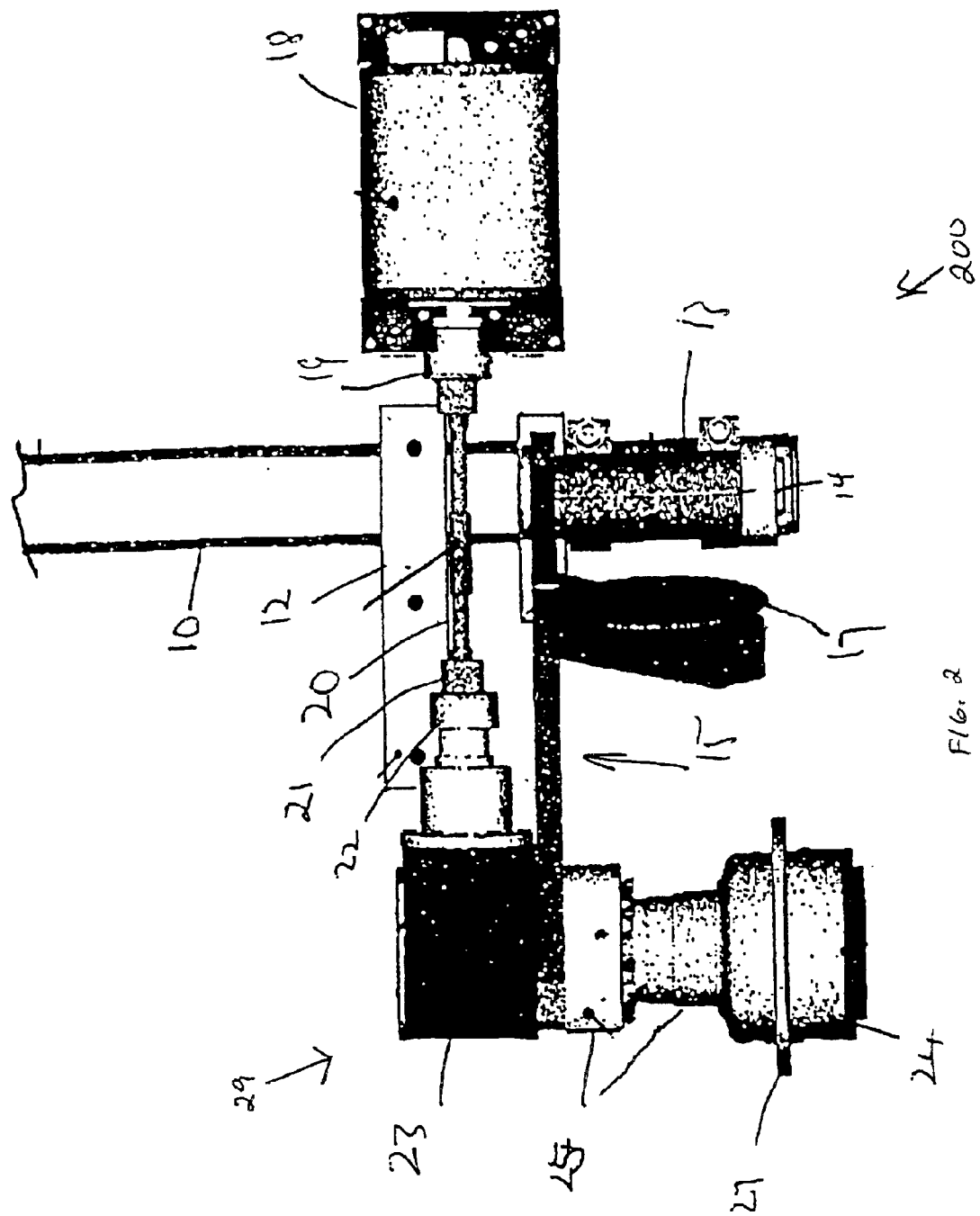
FIG. 2 is a plan view of a vehicle suspension system according to this invention.
Figure 3:
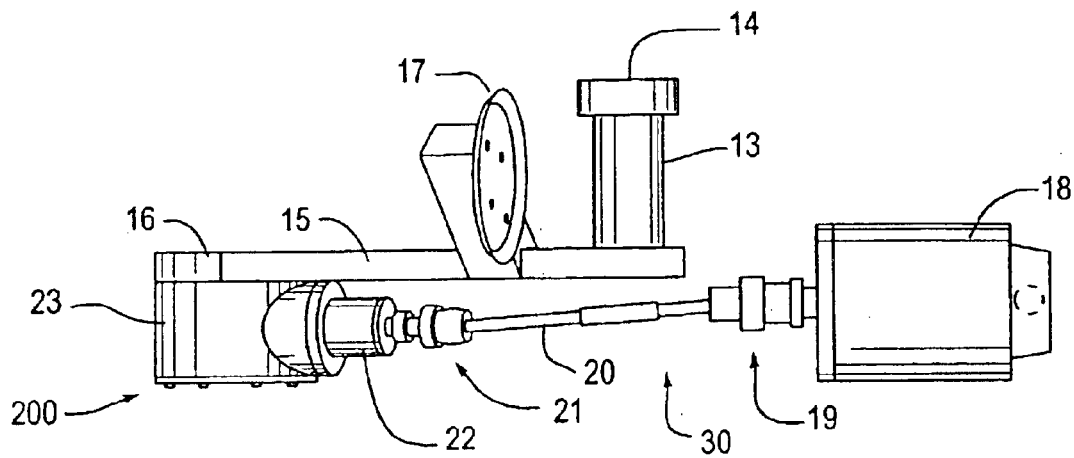
FIG. 3 is a side elevation of the system illustrated in FIG. 2.
Figure 4:
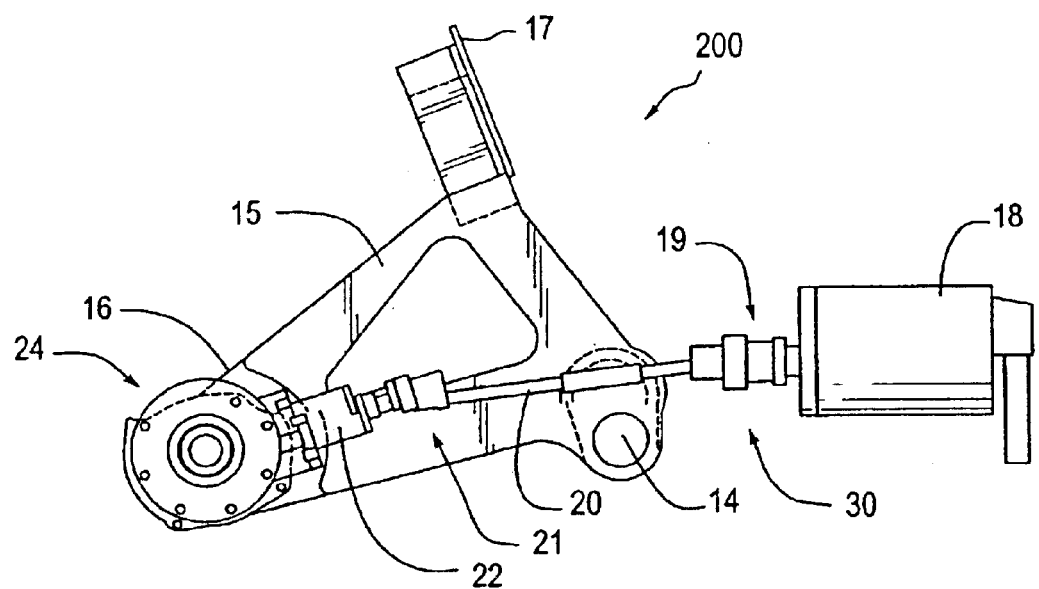
FIG. 4 is a further plan view of the system illustrated in FIGS. 2 and 3.
Figure 5:
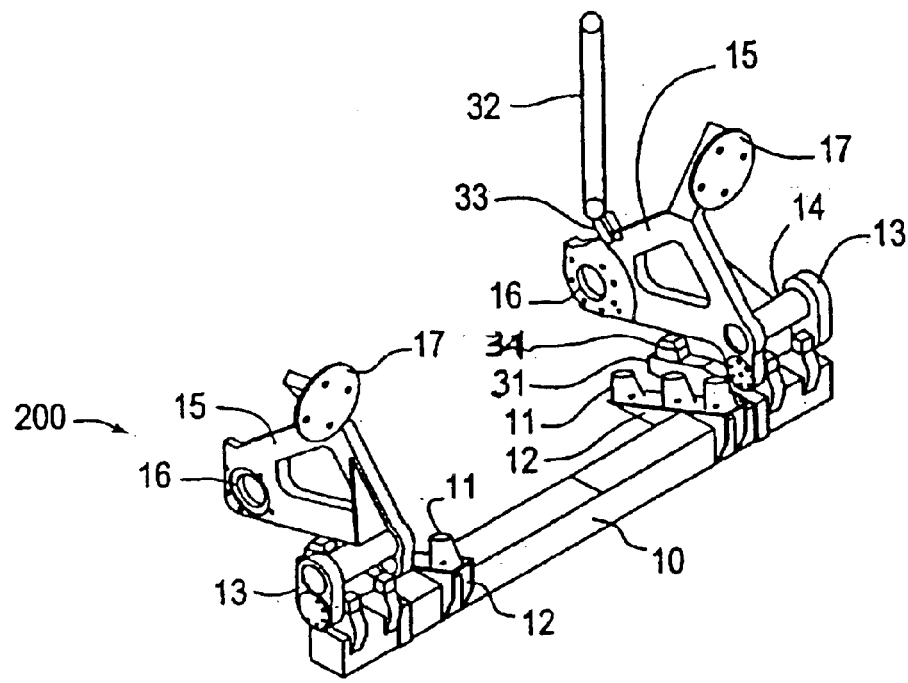
FIG. 5 is a perspective view of a support bar and two of the vehicle suspension systems illustrated in FIGS. 2–4, with the drive units omitted.
Figure 6:
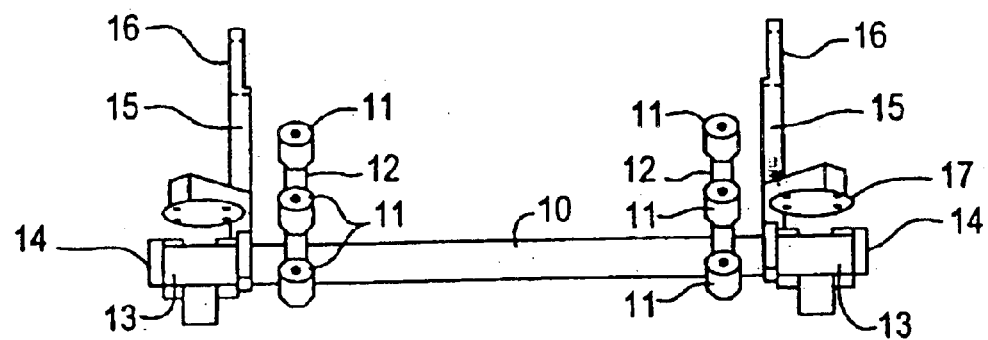
FIG. 6 is a plan view of the assembly of FIG. 5.

An exemplary embodiment of a suspension system 200 according to this invention is illustrated in FIGS. 2–6. This invention has particular application to hybrid vehicles which have two power sources, one an electric power source powered by electric storage means, and the other a primary power source such as an internal combustion engine which is used to generate electric power upon depletion of the electric storage means. For example, suspension system 200 can be utilized on a hybrid electric vehicle, such as bus 100 in FIG. 1. The invention is, however, not limited to hybrid electric vehicles. The invention can be utilized on any wheeled vehicle.

The bus 100 may be of generally conventional construction having a structural unit or chassis 120 on which is mounted the body of the bus 100. Within the body is located the passenger space, including seating. The interior of the body of the bus 100 should have a generally flat floor, although the floor may have upward protrusions where the seating is located. Bus 100 includes four wheels 110, 112, 114, 116, arranged as a front pair of wheels and a rear pair of wheels.

In various exemplary embodiments, the bus 100 includes two rear wheels 114, 116 at opposite sides of the bus 100 and two front wheels 110 and 112, also at opposite sides of the bus 100. The two rear wheels 114, 116 may be driven by independent drive units, while the front wheels 110, 112 are not driven. Stated differently, there may be an individual drive unit for each rear wheel 114, 116. Alternatively, in some embodiments, each wheel 110, 112, 114, 116 may have a separate drive unit, or only the front wheels 110, 112 may be driven, and have separate drive units. In bus 100, the rear wheels 114, 116 are driven by separate drive units.

Mounted to the underside of the rear of the chassis 120 of the bus 100 is a beam 10 which extends transversely to the direction of travel of the vehicle 100. The beam 10 is fixed to the chassis 120 through vibration isolators 11 to reduce the transmission of vibrations in the beam 10 to the chassis 120. The vibration isolators 11 are mounted on a pair of arms 12, spaced from one another along the beam inwardly of the ends of the beam 10. See FIGS. 5 and 6.

Suspension system 200 includes support member 13, pivot 14, trailing arm suspension unit 15, mounting 16, mounting pad 17 and drive unit 30. A support member 13 is rigidly attached to each end of the beam 10. Each support member 13 rotatably receives and engages a pivot 14. In this exemplary embodiment, pivot 14 extends parallel to and is spaced upwardly from the beam 10. Trailing arm suspension unit 15 is fixedly attached to pivot 14, such that trailing arm suspension unit 15 rotates with pivot 14. In this exemplary embodiment, the suspension unit 15 is a trailing arm unit in the form of a triangular frame. One corner of the triangular frame is mounted to pivot 14, such that the axis of rotation of pivot 14 is the axis of rotation of suspension unit 15. Other shapes of trailing arm units can be equally utilized.

A mounting 16 is attached at another corner of the suspension unit 15. Mounting 16 is designed to receive a hub 24 of the wheels 114, 116. The outwardly-extending mounting pad 17 is attached to the third corner of the suspension unit 15. Mounting pad 17 is designed to interface with an air bag (not shown) for a resilient air suspension unit. The air bag is located between a part of the vehicle chassis 120 and the mounting pad 17.

In this exemplary embodiment, each trailing arm suspension unit 15 is associated with a drive unit 30. Drive unit 30 includes electric drive motor 18 and a drive train, as described below. The electric drive motor 18 is rigidly mounted on the vehicle chassis 120. In various exemplary embodiments, the motor 18 is located in a housing (not shown) formed as a protrusion in the floor of the vehicle body which lies above the level of the chassis. The motors 18 are protected because the motors 18 are located in housings formed on the vehicle chassis 120. The motors 18 may be liquid cooled and their location altered to further assist in utilizing this kind of motor.

In this exemplary embodiment, the motor 18 drives the wheel through a drive train which includes a constant velocity joint 19, a drive shaft 20, a further constant velocity joint 21, a spiral bevel gearbox 22 and a right angle gearbox 23. Any other suitable drive train would be utilized. This drive train results in a reduction in the rotational speed from the motor 18 to the mounting 16. The drive from the spiral bevel gearbox 22 is transmitted to the right angle gearbox 23 so that the drive axis is aligned with the rotational axis of the hub 24 and associated wheel. A planetary reduction gearing 25 is located between and interfaces with, the right-angle gearbox 23 and the wheel hub 24 to further reduce the drive ratio to the associated hub 24 and wheel 114, 116.

In practice, the motor 18 rotates at a high speed during driving of the wheel, for example 800 rpm, and a significant reduction is obtained through the gearing to impart a suitable speed of rotation to the wheel 114, 116. For example, the planetary gears 25 may have a gear reduction of the order of 10:1, and may be in the form of two planetary gears in series. The spiral bevel gear 22 may have a reduction ratio in the order of 1.6:1. These reduction ratios are provided as examples only, and any suitable ratios may be utilized.

The constant velocity joints 19 and 21 accommodate pivoting of the suspension unit 15 relative to the chassis 120, which allows the motor 18 and the hub 24 and gearbox assembly 29 (spiral bevel gearbox 22 and right angle gearbox 23) to be relatively displaced according to the movement of the suspension unit 15.

As should be appreciated, in providing the drive assembly, the axis of the pivot 14 of the trailing suspension unit 15 is on one side and below the drive shaft 20.

Rotation of the trailing arm suspension unit 15 about the axis of pivot 14 is "controlled" by the resilient mounting provided by the pad 17 and the associated airbag abutting against a portion of the vehicle chassis 120. This provides a damping force as to the rotation of the suspension unit 15.

Various structural arrangements can be used to provide additional support to the unit 15. An arm 31 may be provided having a rubber support 34 between the arm 31 and the chassis 120. Alternatively, a steel cable (not shown) may extend between the arm 31 and the chassis 120. A shock absorber 32 may also be provided between the arm 15 and the chassis 120, attached by a bracket 33. See FIG. 5. Any suitable structural support member or assembies may be utilized.

In this exemplary embodiment, each of the motors 18 is supplied electrical power from a common source in the form of electric storage means (not shown). To ensure that the motors 18 rotate at the appropriate speeds relative to one another, a control system 130 controls power to the motors 18. In its simplest form, the control system 130 controls the motors 18 to rotate at the same speed so that the drive wheels 114, 116 each rotate at the same speed, which normally occurs when the vehicle 100 is travelling in a straight line. When the vehicle 100 is travelling around a bend, the wheels 114, 116 rotate at different speeds to accommodate for the lack of a differential between the wheels 114, 116. Specifically, the wheel at the outer side of the bus 100 rotates at a faster speed than the wheel at the inner side. Thus, the rotational speeds of the respective motors 18 are determined by the control system 130 according to the turning radius of the bus 100 and other desired driving characteristics. In various exemplary embodiments, the wheel at the outer side of the bend is driven at greater torque than the wheel at the inner side to assist turning of the bus 100. The control system 130 is arranged to monitor the parameters of the vehicle travel and to select the power to each motor 18, including reverse drive.

In addition, the electric drive to the wheels 114, 116 may be utilized to provide regenerative braking by which electrical power is generated during braking of the bus 100 to be fed back into the electric storage means and conserve energy, obtaining more efficient utilization of the available power.

Specifically, in various exemplary embodiments, the wheel hub 24 is fitted with a disk 27 of a disk brake assembly for each wheel 114, 116 whereby the wheels 114, 116 are braked in the usual manner.

The arrangement of the individual components of the suspension system 200 described herein permits the suspension system 200 to be assembled prior to being installed on the bus 100, to ensure that the components are assembled in the desired relative orientation without misaligmnents and other problems, which may arise if the individual components are mounted directly to the vehicle chassis 120. The preassembled construction is attached to the vehicle chassis 120, at predetermined separate locations on the chassis 120, to ensure that the components are in the right relationship to one another and to the bus 100.

It will be seen that the vehicle hubs 24 and wheels 114, 116, are each mounted on the trailing arm suspension unit 15, are independently suspended on the vehicle 100 and can move up and down independently about their pivots 14 to accommodate the road contours in the usual way, and under the restraint and damping action of the airbags. At the same time, the drive is transmitted to the wheels 114, 116 from the motors 18 through the drive transmission arrangement which permits the transmission of power to the hubs irrespective of the relative position of the wheels 114, 116.

While the invention has been described with reference to various exemplary embodiments thereof, it is to be understood that the invention is not limited to disclosed exemplary embodiments or constructions. To the contrary, the invention is intended to cover various modifications and equivalent arrangements. In addition, while the various elements of the disclosed invention are shown in various combinations and configurations, which are exemplary, other combinations and configurations, including more, less or only a single element, are also within the spirit and scope of the invention.

What is claimed is:

1. A wheel suspension assembly for a vehicle having wheels and a chassis, the suspension assembly comprising:
   at least two trailing arm suspension members which are rotatably attachable to the chassis, each suspension member being designed to rotatably receive a wheel for rotation about a first axis;
   at least two electric drive units which are rigidly mounted on the chassis separate from the trailing arm suspension members, each said electric drive unit having an axis of rotation that is substantially perpendicular to the first axis; and a transmission unit for each said electric drive unit, for transferring a drive force from each said drive unit to a respective one of the wheels, each said transmission unit including a gearbox that aligns the rotational axis of the drive unit with the first axis, each said transmission unit also including a constant velocity joint to accommodate pivoting of the suspension member relative to the chassis.

2. The suspension assembly of claim 1, further comprising:

a transverse beam attached to the chassis, the suspension member being attached to the transverse beam.

3. The suspension assembly according to claim 2, wherein the suspension member is attached to the transverse beam at one end of the beam.

4. The suspension assembly of claim 2, further comprising:

vibration isolators between the beam and the chassis.

5. The suspension assembly of claim 2, wherein the drive unit is mounted on the chassis above the transverse beam, and wherein the transmission unit includes a downwardly extending drive shaft.

6. The suspension assembly of claim 1, wherein the transmission unit comprises a gear reduction unit.

7. The suspension assembly of claim 1, further comprising a control unit for controlling at least two of the wheels when driven to obtain the desired drive characteristics of the vehicle, whereby at least two of the wheels may be driven at the same or different speeds according to predetermined drive parameters of the vehicle.

8. The suspension assembly of claim 1, further comprising:

a pivot which is rotatably attachable to the chassis, the suspension member being attached to the pivot.

9. The suspension assembly of claim 1, wherein the transmission unit comprises a drive shaft and two constant velocity joints, said constant velocity joints being located at each end of said drive shaft to accommodate pivoting of the respective suspension member relative to the chassis.

10. The suspension assembly of claim 1, wherein the transmission further includes a drive shaft, step down gearing, and a right angle gear box.

11. The suspension assembly of claim 10, wherein the right angle gearbox is adjacent to a wheel hub that receives the corresponding wheel.

12. A bus containing the suspension assembly of claim 1, wherein the chassis of the bus has a width and each electric drive unit is mountable on the chassis substantially at a widthwise extremity.

13. A wheel suspension assembly for a vehicle having wheels and a chassis, the suspension assembly comprising:

at least two trailing arm suspension members which are rotatably attachable to the chassis, each suspension member being designed to rotatably receive a wheel for rotation about a first axis;

at least two electric drive units which are mountable on the chassis, each said electric drive unit having an axis of rotation that is substantially perpendicular to the first axis; and a transmission unit for each said electric drive unit, for transferring a drive force from each said drive unit to a respective one of the wheels, each said transmission unit including a gearbox that aligns the rotational axis of the drive unit with the first axis, each said transmission unit also including a constant velocity joint to accommodate pivoting of the suspension member relative to the chassis, wherein the trailing arm suspension member is in the form of a triangular frame, wherein a first corner of the triangular frame is mounted to the pivot such that an axis of rotation of the pivot is the axis of rotation of the trailing arm suspension member, wherein a second corner is designed to rotatably receive a wheel and wherein a third corner interfaces with a shock absorption unit.

14. A wheel suspension assembly for a vehicle having wheels and a chassis, the suspension assembly comprising:

at least two spaced trailing arm suspension members which are rotatably attachable to the chassis, each of the at least two suspension members being designed to rotatably receive a wheel for rotation about a first axis;

at least two spaced electric drive units which are rigidly mounted on the chassis separate from the trailing arm suspension members, each said electric drive unit having an axis of rotation that is substantially perpendicular to the first axis; and at least two transmission units, each of said at least two transmission units interconnecting one of said electric drive units to one of the wheels, each of said transmission units transferring a drive force from said corresponding one drive unit to said corresponding one wheel, each said transmission unit including a right angle gearbox that aligns the rotational axis of the drive unit with the first axis and a constant velocity joint between said corresponding one drive unit and said corresponding one wheel to accommodate pivoting of the respective suspension member relative to the chassis.

15. The suspension assembly of claim 14, further comprising:

at least two pivots which are rotatably attachable to the chassis, each of said at least two suspension members being attached to one of said at least two pivots.

16. The suspension assembly of claim 14, wherein each of said at least two transmission units comprises a drive shaft and two constant velocity joints, said constant velocity joints being located at each end of said drive shaft and, being extendible and retractable between the drive unit and the wheel to accommodate pivoting of the respective suspension member relative to the chassis.

17. The suspension assembly of claim 14, wherein the right angle gearbox is adjacent to a wheel hub that receives the corresponding wheel.

18. A wheel suspension assembly for a vehicle having wheels and a chassis, the suspension assembly comprising:

at least two spaced trailing arm suspension members which are rotatably attachable to the chassis, each of the at least two suspension members being designed to rotatably receive a wheel for rotation about a first axis;

at least two spaced electric drive units which are mountable on the chassis, each said electric drive unit having an axis of rotation that is substantially perpendicular to the first axis; and at least two transmission units, each of said at least two transmission units interconnecting one of said electric drive units to one of the wheels, each of said transmission units transferring a drive force from said corresponding one drive unit to said corresponding one wheel, each said transmission unit including a right angle gearbox that aligns the rotational axis of the drive unit with the first axis and a constant velocity joint that is extendible and retractable between said corresponding one drive unit and said corresponding one wheel to accommodate pivoting of the respective suspension member relative to the chassis, wherein the trailing arm suspension members are in the form of a triangular frame, wherein a first corner of the triangular frame is mounted to one of said pivots such that an axis of rotation of the pivot is the axis of rotation of the trailing arm suspension, member, wherein a second corner is designed to rotatably receive a wheel and wherein a third corner interfaces with a shock absorption unit.

* * * * *